United States Patent
Jones et al.

(10) Patent No.: US 8,081,597 B2
(45) Date of Patent: Dec. 20, 2011

(54) QUASI SYNCHRONOUS TRANSMISSION IN CELLULAR NETWORKS

(75) Inventors: Alan Edward Jones, Wiltshire (GB); William John Jones, Chippenham (GB)

(73) Assignee: IPWireless, Inc., San Francisco, CA (US)

( * ) Notice: Subject to any disclaimer, the term of this patent is extended or adjusted under 35 U.S.C. 154(b) by 0 days.

(21) Appl. No.: 12/770,312

(22) Filed: Apr. 29, 2010

(65) Prior Publication Data

US 2010/0215014 A1     Aug. 26, 2010

Related U.S. Application Data

(62) Division of application No. 11/338,062, filed on Jan. 23, 2006, now Pat. No. 7,711,008.

(51) Int. Cl.
*H04W 4/00* (2009.01)

(52) U.S. Cl. ........ 370/328; 370/229; 370/230; 370/231; 370/232; 370/234; 370/235; 370/238; 370/252; 370/254; 370/329; 370/351; 455/500; 455/502; 455/450

(58) Field of Classification Search .......... 370/229, 370/230, 231, 232, 233, 234, 235, 238, 252, 370/254, 328, 329, 338, 351, 355, 356, 392, 370/503, 508, 516, 519; 455/450–452.2, 455/500, 502

See application file for complete search history.

(56) References Cited

U.S. PATENT DOCUMENTS

| 5,892,754 A * | 4/1999 | Kompella et al. ............. 370/236 |
| 6,049,720 A * | 4/2000 | Rude ............................. 455/503 |
| 6,108,315 A | 8/2000 | Freeburg et al. |
| 6,185,428 B1 | 2/2001 | Kingdon et al. |
| 6,212,171 B1 | 4/2001 | LaFollette et al. |
| 6,643,295 B1 | 11/2003 | Nose |
| 6,717,917 B1 * | 4/2004 | Weissberger et al. ......... 370/252 |
| 6,785,300 B2 | 8/2004 | Hoole |
| 6,999,440 B2 | 2/2006 | Abe et al. |
| 7,012,900 B1 | 3/2006 | Riddle |
| 7,068,746 B1 | 6/2006 | Stichter |
| 7,123,616 B2 | 10/2006 | Weissberger et al. |

(Continued)

FOREIGN PATENT DOCUMENTS

DE     19818325     10/1999

(Continued)

OTHER PUBLICATIONS

International Search Report Dated May 31, 2007 from PCT/EP2007/050611.

(Continued)

*Primary Examiner* — Olumide T Ajibade Akonai
(74) *Attorney, Agent, or Firm* — Fitch Even Tabin & Flannery

(57) ABSTRACT

Aspects of the invention include a root node of a wireless communication infrastructure that buffers data packets for transmission by base stations over an air interface. The root node determines a time delay for transmission of a data packet from the root node to each base station, a maximum time delay of those time delays, and a timing latency based upon the maximum time delay. The root node transmits the timing latency to the base stations. In response, each base station initiates transmission of data packets received by the root node after expiration of the timing latency. Alternatively, the root node, instead of the base stations, may buffer the data packets, and transmit them so that they arrive at the base stations at substantially the same time.

30 Claims, 5 Drawing Sheets

U.S. PATENT DOCUMENTS

| | | | |
|---|---|---|---|
| 7,281,053 B2* | 10/2007 | Mantegna et al. | 709/231 |
| 7,385,933 B2 | 6/2008 | Evans | |
| 7,711,008 B2 | 5/2010 | Jones et al. | |
| 2001/0040902 A1 | 11/2001 | Rao | |
| 2003/0021231 A1 | 1/2003 | Evans | |
| 2004/0165532 A1* | 8/2004 | Poor et al. | 370/238 |
| 2005/0163064 A1 | 7/2005 | Choi et al. | |
| 2005/0249215 A1* | 11/2005 | Kelsey et al. | 370/392 |
| 2006/0126509 A1 | 6/2006 | Abi-Nassif et al. | |
| 2006/0250965 A1 | 11/2006 | Irwin | |
| 2007/0147337 A1 | 6/2007 | Bosch et al. | |
| 2007/0147435 A1 | 6/2007 | Hamilton et al. | |

FOREIGN PATENT DOCUMENTS

| | | |
|---|---|---|
| EP | 0 634 851 | 1/1995 |
| EP | 1441480 | 7/2004 |
| GB | 2 321 829 | 6/1998 |
| GB | 2 359 960 | 9/2001 |
| JP | 200227534 | 1/2002 |
| JP | 2004229117 | 8/2004 |
| WO | WO 99/33207 | 7/1999 |

OTHER PUBLICATIONS

"3rd Generation Partnership Project; Technical Specification Group Services and System Aspects; Multimedia Broadcast/Multicase Service (MBMS); Architecture and functional description (Release 6)," (Sep. 2004). 3gpp: Valbonne, France, TS 23.246 V6.4.0:1-42.

Japanese Office Action Dated Jun. 14, 2011; Japanese Patent Application No. 2008-550778 (translation only).

Korean Office Action Dated Apr. 28, 2010; Korean Patent Application No. 10-2008-7020560 (translation only).

* cited by examiner

QUASI SYNCHRONOUS TRANSMISSION IN CELLULAR NETWORKS

RELATED APPLICATIONS

This application is a divisional of U.S. patent application Ser. No. 11/338,062 entitled QUASI SYNCHRONOUS TRANSMISSION IN CELLULAR NETWORKS and filed on Jan. 23, 2006 now U.S. Pat. No. 7,711,008.

BACKGROUND OF THE INVENTION

1. Field of the Invention

The invention relates to utilization of communication resources in cellular communication systems and in particular, but not exclusively, to supporting broadcast communication in a time-division duplex $3^{rd}$ Generation Partnership Project (3GPP) wireless communication system.

2. Description of Related Art

Currently, $3^{rd}$ generation cellular communication systems are being developed to enhance the communication services provided to mobile wireless users. Some widely adopted $3^{rd}$ generation communication systems are based on Code Division Multiple Access (CDMA) and Frequency Division Duplex (FDD) or Time Division Duplex (TDD) technology. In CDMA-only systems, user separation may be obtained by allocating different spreading and/or scrambling codes to different users on the same carrier frequency and in the same time intervals. This is in contrast to time division multiple access (TDMA) systems, where user separation is achieved by assigning different time slots to different users.

In addition, TDD provides for the same carrier frequency to be used for both uplink transmissions, i.e., transmissions from the mobile wireless communication unit (often referred to as wireless subscriber communication unit or user equipment, "UE") to the communication infrastructure via a wireless base station serving a cell, and downlink transmissions, i.e., transmissions from the communication infrastructure to the mobile wireless communication unit via a wireless base station. In TDD, the carrier frequency is subdivided in the time domain into a series of timeslots. The single carrier frequency is assigned to uplink transmissions during some timeslots and to downlink transmissions during other timeslots. An example of a communication system using this principle is the TDD option of the Universal Mobile Telecommunication System (UMTS), as specified in part by 3GPP.

In a conventional cellular system, base stations serving coverage cells in close proximity to each other are allocated non-overlapping transmission resources. For example, in a CDMA network, base stations serving cells within close proximity to each other can be allocated distinct spreading codes (to be used in both the uplink direction and the downlink direction). This may be achieved by, for example, using a common spreading code for both uplink and downlink at each cell, but a different cell-specific scrambling code for each UE within the cell. The combination of these leads to effectively distinct spreading codes at each cell.

In order to provide enhanced communication services, $3^{rd}$ generation cellular communication systems are designed to support a variety of different and enhanced services. One such enhanced service is multimedia services. The demand for multimedia services that can be received via mobile phones and other portable devices is expected to grow rapidly over the next few years. Multimedia services, due to the nature of the data content that is to be communicated, generally require high bandwidth transmission channels.

Typically, in such cellular systems that employ a single carrier frequency, a wireless subscriber unit is 'connected' to one wireless serving communication unit, i.e., a base station of one cell. Base stations in other cells of the network typically generate interfering signals to the wireless subscriber unit of interest. These interfering signals can degrade the maximum achievable data rate that can be maintained with the wireless subscriber unit.

One approach for the provision of multimedia services is to 'broadcast' the multimedia signals, as opposed to sending the multimedia signals in a unicast (i.e., point-to-point) manner. Typically, tens of channels carrying, for example, news, movies, sports, etc. may be broadcast simultaneously over a communication network.

As radio spectrum is at a premium, spectrally efficient transmission techniques are required in order to provide users with as many broadcast services as possible, thereby providing mobile phone users (subscribers) with the widest choice of services. It is known that broadcast services may be carried over cellular networks, in a similar manner to conventional terrestrial television/radio transmissions.

Technologies for delivering multimedia broadcast services over cellular systems, such as the Mobile Broadcast and Multicast Service (MBMS) for UMTS, have been developed over the past few years. In these broadcast cellular systems, the same broadcast signal is transmitted over non-overlapping physical resources on adjacent cells within a conventional cellular system. Consequently, at the wireless subscriber unit, the receiver must be able to detect the broadcast signal from the base station of the cell to which it is connected. Notably, this detection needs to be made in the presence of additional, potentially interfering broadcast signals, transmitted on the non-overlapping physical resources of adjacent cells.

In addition, digital video broadcasting (DVB) technologies have recently evolved and are targeted at delivering broadcast video to mobile handheld (DVB-H) terminals. Often, wireless infrastructure transmitters in such networks operate as wireless repeaters. Hence, a separate and distinct technology, usually a cellular phone technology, is used to provide uplink and downlink unicast signals (which are required to carry control signaling and uplink user traffic) to facilitate broadcast communications to the DVB-H terminal using DVB. In this scenario two independent networks are required (cellular and broadcast networks) which tend to operate at substantially different carrier frequencies. This can have implications from an infrastructure perspective in terms of cost and cell site equipment reuse.

Proposed or implemented techniques for broadcast wireless transmissions require either separate spectrum dedicated for broadcast purposes, or duplicate circuitry in the mobile receiver to receive distinct broadcast and unicast transmissions at respective frequencies.

Thus, typically in a wireless communication network, in order to achieve the high bandwidths envisaged for broadcast transmissions, interference from neighboring cells should be mitigated to achieve the high throughput rates required for a broadcast transmission. Hence, an improved mechanism to address the problem of supporting broadcast transmissions over a cellular network would be advantageous. In particular, a system allowing for the provision of broadcast transmissions in a cellular system to co-exist with the existing cellular system would be advantageous.

In one approach, a cellular network is used to deliver downlink broadcast services in addition to unicast services in both the uplink and the downlink modes such that broadcast services are transmitted simultaneously using identical physical resources by either base stations in all cells of the network or by base stations in a cluster of cells in proximity to each other while unicast services are delivered over non-overlapping physical resources in adjacent cells, as in conventional cellular systems.

For example, in a TD-CDMA based cellular system, the broadcast services can be transmitted over the entire network or over a cluster of cells using the same spreading code(s) while unicast traffic is transmitted using distinct spreading codes in adjacent cells. Furthermore broadcast and unicast transmissions may be performed in different timeslots. This reduces the interference experienced by the mobile receiver while detecting broadcast signals. A requirement is to ensure that the signals from the different cells are quasi-synchronous, meaning that signals from different base stations arrive at a UE receiver within a nominal time window.

The data packets arriving at the base stations from the network controllers must arrive at substantially the same point in time so as to be transmitted at the same point in time. It is assumed that the base stations in the network are synchronized via a synchronization port. Typically GPS is one method for the synchronization of base stations in 3GPP UMTS. The GPS signal is applied to a synchronization port of the base station.

Typically the network controllers are asynchronous. In such a case, the data packets may arrive at the base stations at substantially different points in time. Therefore, even though the base stations are synchronized locally, and synchronized at the air-interface, the transmissions from cells when observed at a UE receiver may appear to be asynchronous at the data packet level. If they do appear out-of-sync at the packet data level, then the signals from the out-of-sync cells will appear as interference because different data packets are simultaneously being transmitted by different base stations. Consequently, the signal-to-noise ratio can degrade and hence the throughput may decrease. Therefore, data packets need to be synchronized at the base stations as well as the air-interface.

SUMMARY

Aspects of the invention include a root node of a wireless communication infrastructure that buffers data packets for transmission by base stations over an air interface. Processing logic in the root node determines a time delay for transmission of a data packet (e.g., the same data packet) from the root node to each base station, a maximum time delay of those time delays, and a timing latency based upon the maximum time delay. The timing latency may be greater than the maximum time delay. The root node transmits the timing latency to the base stations. In response, each base station may initiate transmission of data packets received by the root node after expiration of the timing latency.

The root node may comprise a core network, in which case the time delays are based upon transmission of the data packet from the root node to the base stations via a network controller. In that case, determining the maximum time delay may include determining, for each network controller, a single time delay from the root node to the network controller, and a maximum time delay from the network controller to the base stations corresponding to the network controller. In another embodiment, the root node may comprise the network controller itself.

The time delays may be based upon a round trip data packet transmission delay between the root node and each base station. Alternatively, the processing logic may determine the time delays by incorporating a first time stamp into a request, sending the request to the base stations, and, for each base station, determining a difference between the first time stamp and a second time stamp incorporated by the base station in a response to the request, which is received by the root node.

In another embodiment, the root node, instead of the base stations, buffers the data packets. In that case, processing logic in the root node determines the time delay for transmission of a data packet from the root node to each base station, determines a maximum time delay of the time delays; and initiates transmission of the data packets (e.g., the same data packets) to each base station based upon a corresponding latency differential between the maximum time delay and the time delay from the root node to each corresponding base station. For example, the root node may initiate transmission of the data packets to the base station associated with the maximum time delay; and initiate transmission of the data packets to a second base station after expiration of the latency differential associated with the second base station. According to this technique, the first of the data packets arrives at each base station at substantially the same time, such as within the scheduling interval of each base station.

BRIEF DESCRIPTION OF THE DRAWINGS

Embodiments of the invention will be described, by way of example only, with reference to the drawings, in which.

DETAILED DESCRIPTION

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Some portions of the detailed description which follows are presented in terms of procedures, steps, logic blocks, processing, and other symbolic representations of operations on data bits that can be performed on computer memory. A procedure, computer executed step, logic block, process, etc., are here conceived to be a self-consistent sequence of steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Several embodiments of the invention are described below. These embodiments are described with reference to 3GPP UMTS systems, specifications and recommendations, but are applicable more generally.

Figure 1:
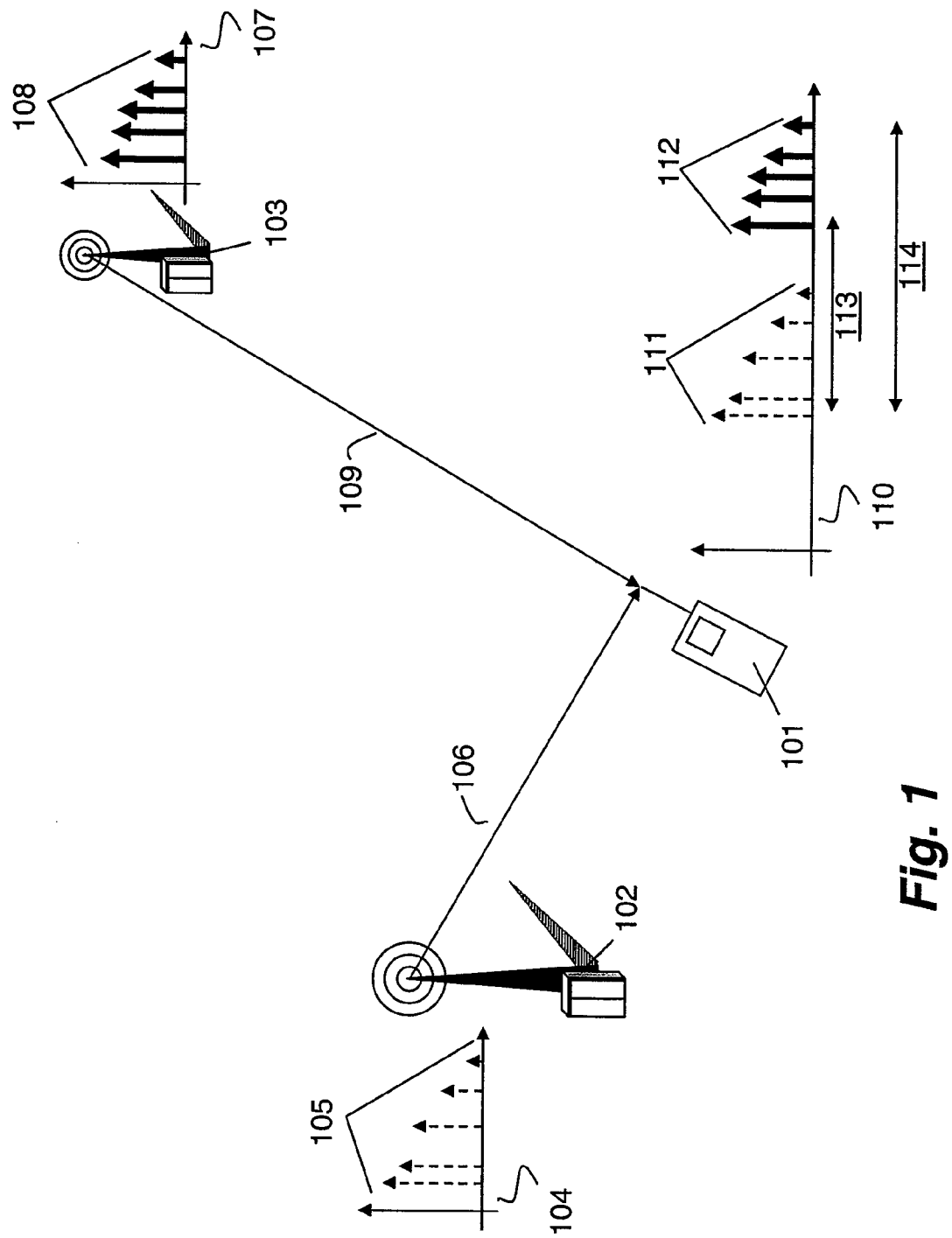
FIG. 1 illustrates the reception of broadcast signals from two base stations by a subscriber terminal.

The concept of a broadcast system operating in a cellular network on the same carrier as a conventional cellular system has been described above. To increase the cell throughput for broadcast transmissions, the same signal is transmitted at the same time (or about the same time) from multiple base stations in a network that supports broadcast services. The mobile receiver receives these signals and processes them as multipath components, combining the signals in an optimum (or nearly optimum) manner as part of the receiver processing. This is illustrated in FIG. 1 for the case of two base stations transmitting in broadcast mode. Those skilled in the art will recognize that all network elements described herein (e.g., network controllers, base stations, user equipment) include transmitters and receivers under the control of processors and/or other logic.

Base station 102 is physically closer to mobile receiver 101 than base station 103. The respective signal propagation distances are labeled 106 and 109, respectively. Graph 104 is a magnitude versus time plot of multipath signal impulse response resulting from a base station 102 transmission, in a communication theory context (although actually, physically realizable signals are transmitted). Here the signals arriving at the receiver appear at nominally the same point in time, i.e., they appear quasi-synchronously (meaning that they are aligned, or are nearly aligned in time). Although only one impulse is transmitted by each base station, multiple impulses 105 can result from signal reflections corresponding to multiple propagation paths. The result is that the impulse response is smeared out in time. This is sometimes referred to as channel dispersion.

Often, CDMA receivers use a Rake receiver to resolve individual multipath components and combine them with appropriate delays to compensate for the channel dispersion. Graph 107 is a magnitude versus time plot of multipath signal impulse response resulting from a base station 103 transmission, with 108 being the corresponding multiple impulses. Although base stations 102 and 103 ostensibly transmit the same data at the same (or nearly the same) time, because propagation path 109 is longer than propagation path 106, when the signals are received by mobile receiver 101, they are offset in time as shown in magnitude versus time plot 110. Impulse cluster 112 resulting from the base station 103 transmission arrives later than impulse cluster 111 resulting from base station 102 transmission because propagation path 109 is longer than propagation path 106. Time interval 113 in graph 110 is the difference in propagation time between paths 109 and 106. Time interval 114 is an effective channel dispersion for the combined base station transmissions that can be compensated for by receiver signal processing, such as a Rake receiver, if the time interval is short enough.

Figure 2:
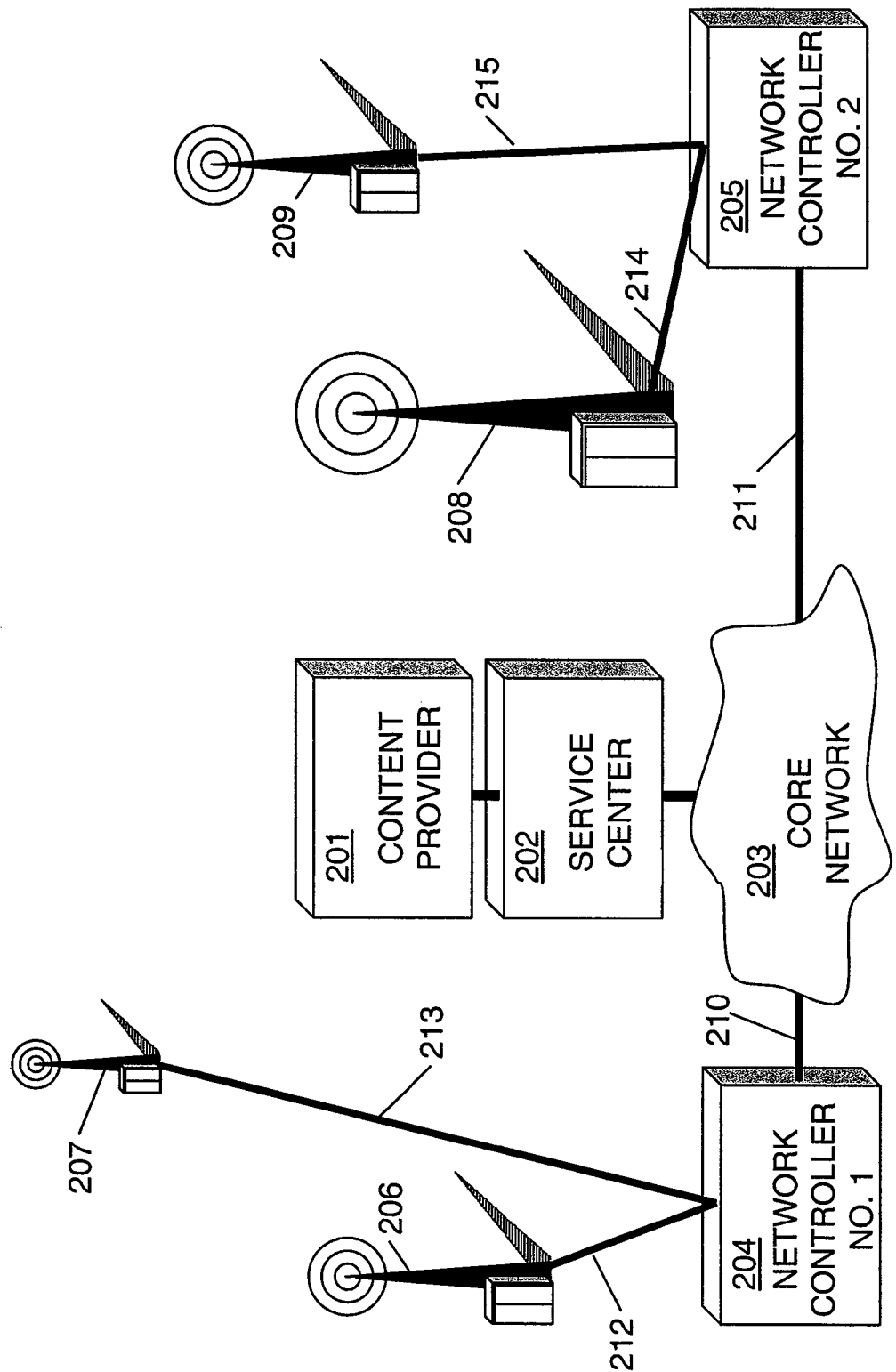
FIG. 2 illustrates an infrastructure network.

An exemplary network architecture is shown in FIG. 2. Base stations 206 through 209 provide wireless transmissions to mobile receivers. Network controllers 204 and 205 each control multiple base stations. The network controllers control the radio resource and provide an interface between the base stations and core network 203. The core network 203 provides session management and routing of data to external networks. The service center 202 provides scheduling of broadcast information, provides an interface to a content provider, and may provide security and authentication. In 3GPP terminology: (i) a base station is a Node B; (ii) a network controller is a RNC; (iii) the core network is a 3G core network, providing an serving GPRS support node (SGSN) interface into the RNC; and (iv) the service center is a BM-SC (Broadcast Multicast-Service Center) that interfaces into the GGSN of the 3G core network. The data from the content provider 201 passes through the service center 202 (BM-SC) and the core network. The data is sent from the core network to a plurality of network controllers. Note the data sent to each network controller is identical. 3GPP technical specification TS23.246 v6.4.0 "3rd Generation Partnership Project; Technical Specification Group Services and System Aspects; Multimedia Broadcast/Multicast Service (MBMS); Architecture and Functional Description (Release 6)," published by the 3GPP Support Office, 650 Route des Lucioles—Sophia Antipolis, Valbonne—FRANCE, contains further details, and is incorporated by reference herein.

If the signals from the different base stations are quasi-synchronous, meaning signals from different base stations arrive at the UE receiver within a nominal time period, the individual multipath signal components can all be resolved and combined with appropriate time delays by the UE receiver's signal processing circuitry. The data packets arriving at the base stations from the network controllers must arrive at substantially the same point in time so as to be re-transmitted at the same point in time. In some embodiments, the system ensures that, the data arrives within the scheduling interval of the base station. It is assumed that the base stations in the network are synchronized locally via a synchronization port. GPS is one method for synchronization of base stations. The GPS signal is applied to the synchronization port of a base station.

As discussed above, the network controllers are typically asynchronous. In such a case, the data packets may arrive at the base stations at substantially different points in time. Therefore, even though the base stations are synchronized locally, and synchronized at the air-interface, the transmissions from cells when observed at a UE receiver may appear to be asynchronous at the data packet level. If they do appear out-of-sync at the data packet level, then the signals from the out-of-sync cells will appear as interference because different data packets are simultaneously being transmitted by different base stations. Consequently, the signal-to-noise ratio can degrade and hence the throughput can be reduced. Referring to FIG. 1, the signal-to-noise ratio for the out-of-sync case is given by $$SNR = \frac{P_1}{P_2 + n} \quad (1)$$

where $P_1$ is the received power in 111, $P_2$ is the received power in 112, and n is thermal noise. If the transmitted data packets from all base stations are in-sync, then the transmissions appear as multipath components at the UE. Thus once they have been identified, they can be coherently combined through the usual detection algorithms. The outcome of this is that the effective SNR is vastly improved, as both the wanted signal component has been increased and additionally the interference component has been reduced. Referring to FIG. 1, the signal-to-noise ratio for the in-sync case is given by $$SNR = \frac{P_1 + P_2}{n} \quad (2)$$

Therefore, data packets need to be synchronized at the base stations as well as at the air-interface. Embodiments of the current invention provide novel techniques for synchronizing the data packets at the base station to ensure quasi-synchronous transmission.

This problem can also arise even when the network controllers are synchronized. For example, with reference to FIG.

2, if the propagation delay 210 is less than the propagation delay 211, then data from the core network 203 will arrive at Network Controller #1 (204) before it arrives at Network Controller #2 (205). Even if the network controllers were synchronized via a master synchronization signal, transmission delays between network elements would still result in different arrival times at the base stations, owing to differing propagation delays 212 through 215. Clearly, to enable quasi-synchronous broadcast transmission, the same data packets have to be transmitted at the same (or about the same) time by all of the base stations in broadcast mode. Embodiments of the present invention ensure that the transmissions of data packets from all base stations of interest are substantially synchronized at the data packet level.

Figure 3:
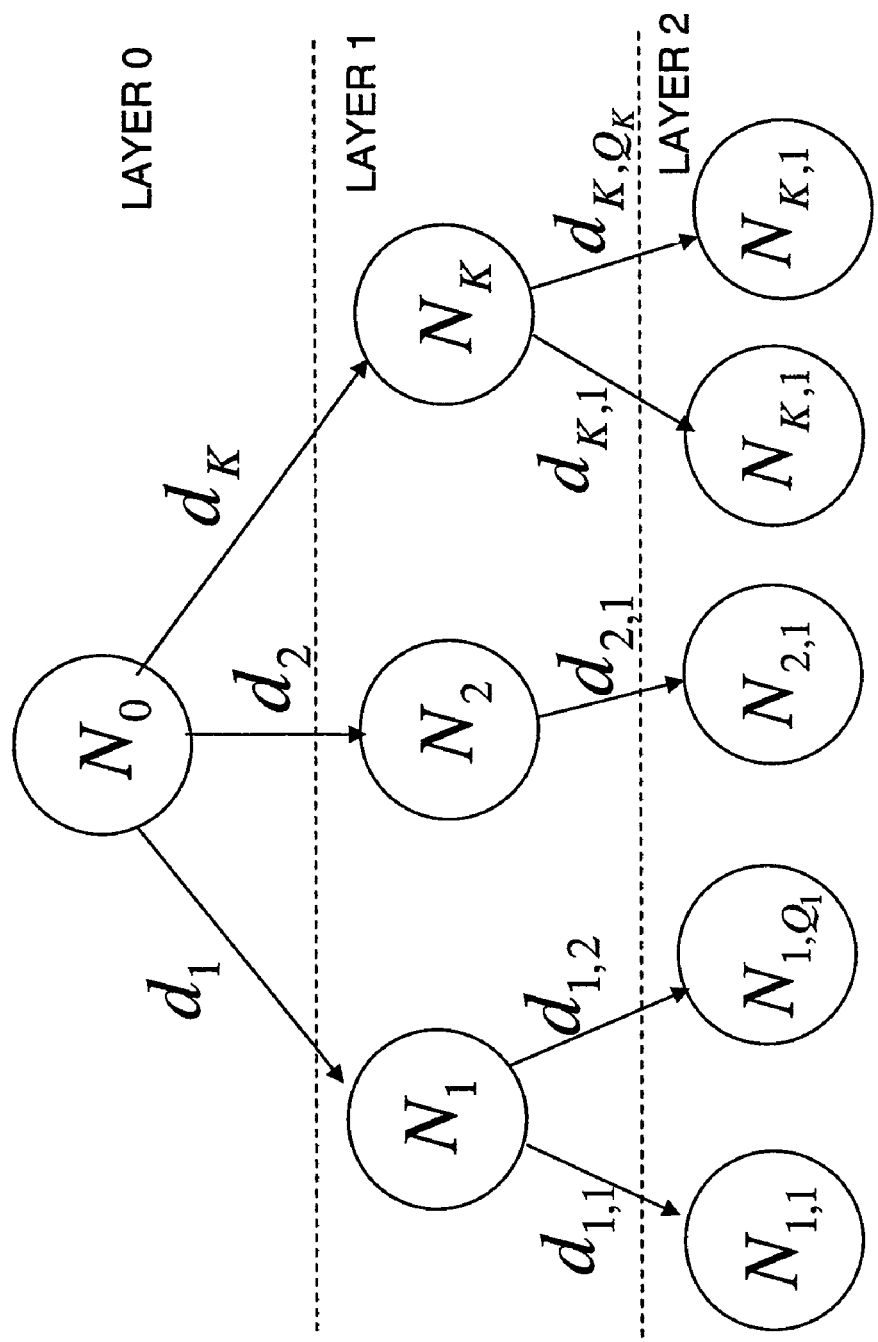
FIG. 3 illustrates a tree of network nodes, with associated inter-node transmission delays.

Consider the network diagram shown in FIG. 3. The nodes in the tree are network elements (e.g., core network, network controllers, and base stations) and the connections between nodes are the inter-element delays. The architecture is assumed to be hierarchical, and, in this example, consists of 3 layers. The diagram shows a three layer architecture: layer 0 corresponds to the Root Node, layer 1 is connected to the Root Node and has K network elements, and layer 2 is the lowest layer (or terminal node layer) in the hierarchy and has $Q_k$ network elements for each network element in layer 1. We define the network element, $N_0$, as the source node or Root Node. In one embodiment, the Root Node physically corresponds to the core network.

The delay between network element $N_0$ and $N_k$ where k=1, ..., K is defined by $d_k$, and the delay between network element $N_k$ and $N_{k,q}$ where q=1, ..., $Q_k$ is defined by $d_{k,q}$. The delay is defined in units of seconds. The maximum delay from network element $N_0$ through network element $N_k$ (k≠0) to network element $N_{k,q}$ is given by $$D_k = \max_q (d_k + d_{k,q}) \quad (3)$$

Where the function max( ... ) determines the maximum value by keeping k constant and changing q over the range 1 to $Q_k$. Let the vector $D=(D_1, D_2, ..., D_K)$ be the set of delays, and define the maximum delay from the Root Node to layer 2 as $$D_{max} = \max(D) \quad (4)$$

Figure 4:
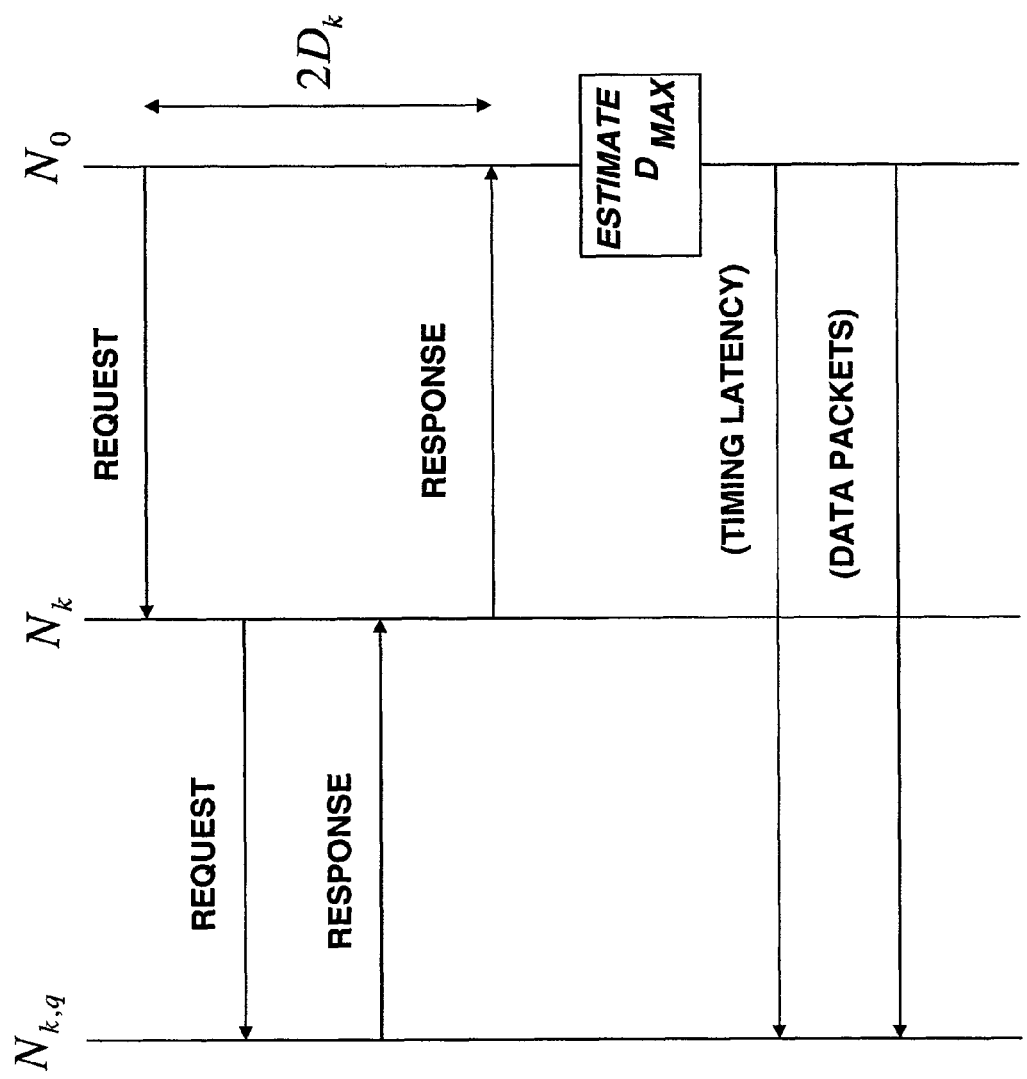
FIG. 4 illustrates a method by which a root node acquires transmission delay information according to an embodiment of the invention.

FIG. 4 illustrates an embodiment in which the Root Node acquires the delay information associated with network elements $N_k$ and $N_{k,q}$. The Root Node $N_0$ sends a message "REQUEST" to network element $N_{k,q}$. The message "REQUEST" from the Root Node requests a "RESPONSE" message from the network element $N_{k,q}$. In this example, the network element $N_k$ provides message forwarding between $N_k$ and $N_{k,q}$. When the Root Node receives the message "RESPONSE," the total delay is the round trip delay, which will be equal to $2D_k$. To obtain the one way delay, the round trip delay is halved. The Root Node repeats the above procedure for each network element in the lowest (terminal node) layer until it has all delays in the network. When the Root Node has estimated all delays, the Root Node uses equation 2 to estimate the longest delay in the network.

Given the maximum delay, $D_{max}$, the Root Node can now estimate the earliest point in time at which the data can be simultaneously transmitted by the network elements $N_{k,q}$ in the lowest layer (e.g., the base station layer). The Root Node signals to all of the network elements $N_{k,q}$ a timing latency for transmission. The timing latency period is greater than or equal to $D_{max}$. The Root Node then commences transmission of the data packets to the network elements at the lowest layer (i.e., the base stations).

It will be understood by those skilled in the art that if the delays between the Root Node and terminal nodes are non-reciprocal (upstream delay and downstream delay differ), sufficient margin should be added to $D_{max}$. According to other embodiments, methods for estimating the one-way delay from the Root Node to the lowest layer can alternatively use time stamping at the Root Node and the lowest layer network element. This can be included as part of the messaging "REQUEST" and "RESPONSE". In other words, the RESPONSE message will provide to the Root Node the time at which the REQUEST message was received at the lowest layer, which can be compared to the time the REQUEST message was sent. The sent REQUEST time could be included with the REQUEST message, thereby allowing the RESPONSE message to include the difference representing the one-way delay, which may be calculated by the lowest layer network element Additional methods of estimating the margin may be devised by those skilled in the art of communication system design.

Figure 5:
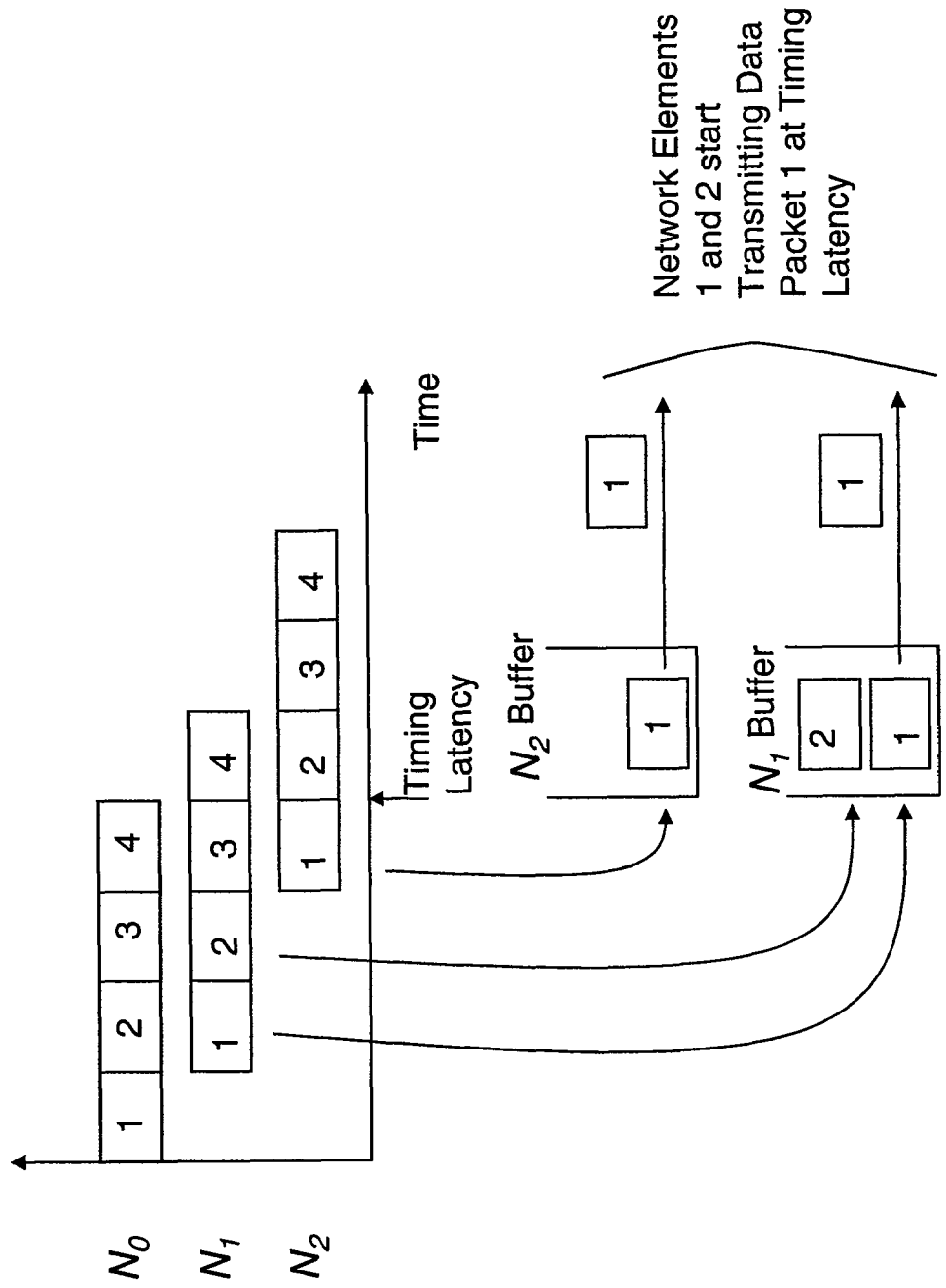
FIG. 5 illustrates data packet buffering according to a further embodiment of the invention.

It is highly likely that the network delays will differ between the different network terminal nodes and the Root Node. To overcome this problem, buffering of the data packets is used at the network elements in the lower layer (e.g., base stations). The buffering is required to store the information at least until the time at which the maximum delay (the "timing latency") is reached. This is shown in FIG. 5.

In this example there are only two layers. The delay from the Root Node $N_0$ to the first network element $N_1$ is less than the delay from the Root Node to the second network element $N_2$. The Root Node transmits four consecutive packets of data. The data buffer in the first network element has two data packets stored when the second network element receives the first data packet. The timing latency is set to at least the maximum delay. When the timing latency is reached, the first data packet is transmitted simultaneously from the first and second network elements (e.g., base stations), thus helping to establish quasi-synchronous transmission at the air interface. The transmission continues until all four data packets have been transmitted.

In one 3GPP embodiment, the network has three layers; the Root Node or network element at layer 0 is an SGSN, the network elements in layer 1 are RNCs, and the network elements in layer 2 are Node Bs. In another 3GPP embodiment, there are only 2 layers, the Root Node or network element at layer 0 is an RNC, and the network elements in layer 1 are Node Bs. It will be understood that various embodiments of the invention can support multiple layers, but ultimately each embodiment requires a single Root Node.

In another embodiment, instead of buffering the data packets at the lower-layer network elements (base stations, in this example), the system buffers the data packets at the Root Node, and transmits the data packets from the Root Node at different times to each base station so that the data packets arrive at the base stations at substantially the same time, e.g., within the scheduling interval of the base station. This technique does not require the timing latency to be signalled to the base stations. Instead, the Root Node computes the difference, $\Delta_i$, between $D_{max}$ and the delay from the Root Node to each base station, $BS_i$. After initiating transmission of the data packets to the base station, $BS_{max}$, associated with the maximum delay $D_{max}$, the Root Node waits for expiration of the difference, $\Delta_i$, before initiating transmission of the data packets to the corresponding base station, $BS_i$.

While the invention has been described in terms of particular embodiments and illustrative figures, those of ordinary skill in the art will recognize that the invention is not limited to the embodiments or figures described.

Those skilled in the art will recognize that the operations of the various embodiments may be implemented using hardware, software, firmware, or combinations thereof, as appropriate. For example, some processes can be carried out using digital circuitry or computers (generically referred to herein as computers or processors) under the control of software, firmware, or hard-wired logic. Software and firmware can be stored on computer-readable media. Some other processes can be implemented using analog circuitry, as is well known to one of ordinary skill in the art.

It will be appreciated that, for clarity purposes, the above description has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method performed for transmission data packets by a plurality of base stations over an air interface, the method comprising, at a root node of a wireless communication infrastructure:
   determining a plurality of time delays for transmission of a data packet from the root node to the plurality of base stations;
   determining a maximum time delay from the plurality of time delays; and
   initiating transmission of a plurality of data packets to each base station of the plurality of base stations based upon a corresponding latency differential between the maximum time delay and the time delay from the root node to each corresponding base station.

2. The method of claim 1, wherein initiating transmission comprises:
   initiating transmission of the plurality of data packets to a first base station associated with the maximum time delay; and
   initiating transmission of the same plurality of data packets to a second base station of the plurality of base stations after expiration of a latency differential associated with the second base station.

3. The method of claim 1, wherein a first of the plurality of data packets arrives at each base station of the plurality of base stations at substantially the same time.

4. The method of claim 2, wherein a first of the plurality of data packets arrives at each base station of the plurality of base stations within a scheduling interval of each base station.

5. The method of claim 1, wherein initiating transmission comprises initiating transmission of the same plurality of data packets to each base station of the plurality of base stations.

6. The method of claim 1, wherein:
   the root node comprises a core network; and
   determining time delays comprises determining the plurality of time delays for transmission of at least one data packet from the root node to the plurality of base stations via a network controller.

7. The method of claim 6, wherein determining a maximum time delay comprises determining, for each network controller, a single time delay from the root node to the network controller, and a maximum time delay from the network controller to each of the plurality of base stations.

8. The method of claim 1, wherein the root node comprises a network controller.

9. The method of claim 1, wherein determining a plurality of time delays comprises determining a round trip data packet transmission delay between the root node and each base station.

10. The method of claim 1, wherein determining a plurality of time delays comprises determining from a difference between a first time stamp incorporated in a data packet at the root node in association with a request issued to a base station by a first transmission of the data packet, and a second time stamp incorporated in the data packet at the base station in association with a corresponding response to the request received by the root node in a second transmission of the data packet.

11. A root node of a wireless communication infrastructure for buffering data packets for transmission by a plurality of base stations over an air interface, the root node comprising:
   a transmitter for transmitting a plurality of data packets to the plurality of base stations;
   a receiver for receiving from each base station of the plurality of base stations at least one data packet that is responsive to at least one data packet transmitted by the transmitter; and
   processing logic for computing a maximum data packet transmission time delay based upon responsive data packets received from the plurality of base stations, and for initiating transmission by the transmitter of the plurality of data packets to each base station based upon a corresponding latency differential between the maximum delay and a time delay from the root node to each corresponding base station.

12. The root node of claim 11, wherein the processing logic is operable to:
   initiate transmission of the plurality of data packets to a first base station associated with the maximum time delay; and
   initiate transmission of the same plurality of data packets to a second base station of the plurality of base stations after expiration of a latency differential associated with the second base station.

13. The root node of claim 11, wherein the processing logic is operable to initiate transmission so that a first of the plurality of data packets arrives at each base station of the plurality of base stations at substantially the same time.

14. The root node of claim 11, wherein the processing logic is operable to initiate transmission so that a first of the plurality of data packets arrives at each base station of the plurality of base stations within a scheduling interval of each base station.

15. The root node of claim 11, wherein the processing logic is operable to initiate transmission of the same plurality of data packets to each base station.

16. The root node of claim 11, wherein:
the root node comprises a core network; and
the processing logic is operable to determine the maximum transmission delay for transmission of at least one data packet from the root node to the plurality of base stations via a network controller.

17. The root node of claim 16, wherein the processing logic is operable to determine the maximum transmission delay by determining, for each network controller, a single time delay from the root node to the network controller, and a maximum time delay from the network controller to each of the plurality of base stations.

18. The root node of claim 11, wherein the root node comprises a network controller.

19. The root node of claim 11, wherein the processing logic is operable to compute the time delay to each base station of the plurality of base stations based upon a round trip data packet transmission delay between the root node and each base station.

20. The root node of claim 11, wherein the processing logic is operable to cause the transmitter to issue a request to each base station including a first time stamp, and determine the corresponding time delay for each base station based upon a difference between the first time stamp and a second time stamp incorporated by each base station in a corresponding response to the request received by the root node in a second transmission of the data packet.

21. A tangible computer program product having computer-executable code stored therein for transmission of data packets to a plurality of base stations of the wireless communication infrastructure over an air interface, the program code operable for, when executed at a root node of a wireless communication infrastructure:
determining a plurality of time delays for transmission of a data packet from the root node to the plurality of base stations;
determining a maximum time delay from the plurality of time delays; and
initiating transmission of a plurality of data packets to each base station of the plurality of base stations based upon a corresponding latency differential between the maximum time delay and the time delay from the root node to each corresponding base station.

22. The tangible computer program product of claim 21, wherein initiating transmission comprises:
initiating transmission of the plurality of data packets to a first base station associated with the maximum time delay; and
initiating transmission of the same plurality of data packets to a second base station of the plurality of base stations after expiration of a latency differential associated with the second base station.

23. The tangible computer program product of claim 21, wherein the code is further operable for causing a first of the plurality of data packets to arrive at each base station of the plurality of base stations at substantially the same time.

24. The tangible computer program product of claim 22, wherein the code is further operable for causing a first of the plurality of data packets to arrive at each base station of the plurality of base stations within a scheduling interval of each base station.

25. The tangible computer program product of claim 21, wherein the code is further operable for initiating transmission comprises initiating transmission of the same plurality of data packets to each base station of the plurality of base stations.

26. The tangible computer program product of claim 21, wherein:
the root node comprises a core network; and
wherein the code is further operable for determining time delays comprises determining the plurality of time delays for transmission of at least one data packet from the root node to the plurality of base stations via a network controller.

27. The tangible computer program product of claim 26, wherein the code is further operable for determining a maximum time delay comprises determining, for each network controller, a single time delay from the root node to the network controller, and a maximum time delay from the network controller to each of the plurality of base stations.

28. The tangible computer program product of claim 21, wherein the root node comprises a network controller.

29. The tangible computer program product of claim 21, wherein the code is further operable for determining the plurality of time delays based upon determining a round trip data packet transmission delay between the root node and each base station.

30. The tangible computer program product of claim 21, wherein the code is further operable for causing the transmission of a request, including a first time stamp, to each base station of the plurality of base stations, and determining the corresponding time delay for each base station based upon a difference between the first time stamp and a second time stamp incorporated in a corresponding response to the request received by the root node from each base station.

* * * * *